3,275,592
CYANURATE AND ISOCYANURATE STABILIZED HALOGEN-CONTAINING OLEFIN POLYMER COMPOSITIONS
Hendrikus J. Oswald, Morristown, and Edith Turi, Livingston, N.J., assignors to Allied Chemical Corporation, New York, N.Y., a corporation of New York
No Drawing. Filed Dec. 12, 1963, Ser. No. 329,977
4 Claims. (Cl. 260—45.8)

This invention relates to the stabilization of halogen-containing polyolefins against the harmful effects of high temperatures. More particularly, it relates to new chlorinated polyethylene compositions having good thermal stability.

It is well known that halogen-containing polyolefins such as polyvinyl chloride, chlorinated polyethylene and chlorinated polypropylene are adversely affected when they are exposed to elevated temperatures either during fabrication or in use. The effect of such exposure manifests itself in a darkening of the color of the material; also a noticeable change in viscosity occurs, which is demonstrated by the increased work required to fabricate such heated material by extrusion or in a blender-mixer such as a Banbury mixer. It is generally believed that this temperature exposure-caused change in viscosity is due to splitting hydrogen halide out of the polymer molecule coupled with increased crosslinking of the polymer molecules. The degradation of the physical properties is often also manifested by increased brittleness, loss of impact strength, deterioration of electrical insulation characteristics, etc. The degradation mechanism is believed to result in the crosslinking or gel formation of the originally substantially non-crosslinked chain polymer.

Many additives have been proposed in the prior art for retarding the degradation process. Such additives allow fabrication and use of these heat sensitive plastics at elevated temperatures without impairment in properties, thereby extending their useful lives. Metal salts of organic acids, metal phenolates, organometallic compounds, esters of phosphorous acid and various inorganic salts have been so used. The disadvantages of additives of metallic and inorganic compositions is that they are generally incompatible with the polymers causing loss of transparency, discoloration and non-homogeneous appearance resulting from segregation.

Not all additives have the same effect on the same polymer, nor is there any predictable consistency in the stabilizing effect when the prior art additives are used in various types of halogenated polyolefins. For instance, products which are valuable for use with polyvinyl chloride compositions may or may not be of value in certain chlorinated polyethylene compositions.

It is an object of this invention to provide heat stable compositions based upon chlorinated polyethylene. It is a further object to provide such compositions which are thermally stabilized with metal-free organic stabilizers.

According to our invention, chlorinated ethylene homopolymer can be given improved thermal stability by an addition of certain derivatives of cyanuric acid and of isocyanuric acid, being selected from the group consisting of:

triallyl cyanurate:

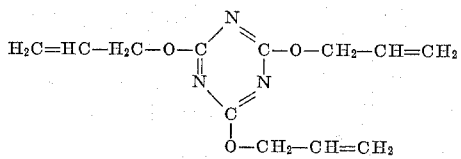

tribenzyl cyanurate: (2,4,6-tribenzyloxy-s-triazine):

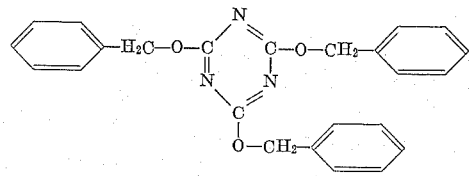

2,4,6-(p-ethylphenyl)cyanurate, (2,4,6-tris(4-ethylphenoxy)-s-triazine):

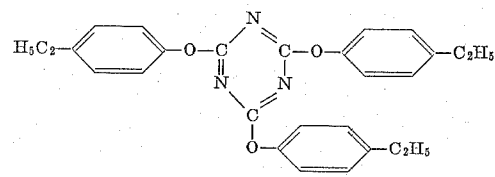

triallyl isocyanurate,

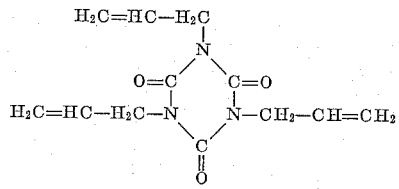

tris(2-hydroxyethyl)isocyanurate,

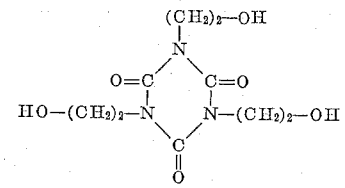

While the concentration of the stabilizer does not appear to be critical, the preferred range was found to be between 0.5 and 10 percent by weight of the polymer.

These stabilizers practically inhibit crosslinking at a temperature as high as 200° C. for a period of at least 60 minutes and also prevent drastic discoloration. This effect is more surprising in view of several hundred other compositions of a variety of molecular structures which were tested on chlorinated polyethylene and had practically no stabilizing effect at all, or allowed at least moderate crosslinking with no inhibiting effect upon discoloration.

The stabilizers can be employed with other common additives used in halogenated polyolefin formulations, such as stabilizers against the effects of radiation, fillers, pigments, and dyes. The stabilizer can be incorporated into the polymer formulation by any known blending technique.

The effectiveness of these stabilizers can be measured by determination of the extent of crosslinking which is occasioned in the polymer by exposure to elevated temperatures. This crosslinking can be measured by the amount of gel formation. The latter can be determined as the percentage of the polymer originally entirely soluble in monochlorobenzene which is no longer soluble after the heat treatment. Gel formation increases viscosity and slows the rate of extrusion of the polymer if extrusion is carried out at a constant pressure on the polymer.

A further measure of effectiveness of stabilization is the comparison of color of the unstabilized material with that of the stabilized material after both have been exposed to elevated temperatures.

The chlorinated polyethylene stabilized by our invention can contain from about 20 to about 70% by weight chlorine. In a preferred embodiment, the chlorinated polyethylene is randomly chlorinated whereby it is essentially amorphous, and has a low brittle point (glass transition temperature), such as about 0° C. or lower at 20 percent chlorine content and rising with chlorine content to about 150° C. at 70 percent chlorine content. Particularly suitable polyethylenes to be chlorinated for use in our invention are those produced as described in Example 6 of British Patent No. 858,674, of January 11, 1961, to Allied Chemical Corporation. Such polyethylenes can be chlorinated with advantage for use in our invention by the process described in Example 3 of French Patent No. 1,316,044 of December 17, 1962, to Allied Chemical Corporation.

The polymerization process of British Patent No. 858,674 results generally in a polymer of high molecular weight such as 500,000 to 5,000,000 weight average molecular weight, and of density of about 0.935 to 0.96 gm./cm.$^3$ at 25° C. The molecular weight of the polymer can be reduced by a thermal treatment, for instance in accordance with the process outlined at page 12, lines 73–77 of the above-identified British Patent No. 858,674. The molecular weight of the resulting polyethylenes will be in the range of about 20,000 to 300,000, and the density will be about 0.94–0.985 gm./cm.$^3$ at 25° C.

The foregoing molecular weights are calculated from the intrinsic viscosity of a solution of the polymer in Decalin, according to the method of P. S. Francis et al. (Journal of Polymer Science, volume 31, pp. 453–466), i.e. by using the following formula:

$$[\eta] = 6.77 \times 10^{-4} \times M^{0.67}$$

where $[\eta]$ is the intrinsic viscosity in deciliters per gram, and M is the weight average molecular weight.

When polyethylenes of molecular weights such as 100,000 and below are chlorinated for use in our invention, solution chlorination methods can be used to advantage to obtain the desired amorphous products.

The glass transition temperatures above cited can be determined by a standard test for stiffness (ASTM test D–1043–61T), as the temperature below which the stiffness sharply increases so that the sample becomes brittle. A typical stiffness modulus at the glass transition temperature for the subject chlorinated polyethylenes is $1.45 \times 10^4$ p.s.i.

One preferred group of randomly chlorinated polyethylenes of chlorine content in the range 20–70 percent by weight used in our invention, will have relatively high intrinsic viscosities from about 1.5 to about 5 deciliters per gram, indicating high molecular weight. Other useful and preferred chlorinated polyethylenes, not necessarily amorphous, will have intrinsic viscosities from about 0.2 to about 1.5 deciliters per gram, indicating lower molecular weight of the polymer. These intrinsic viscosities are determined upon a 0.1 gram per 100 ml. solution in o-dichlorobenzene at 100° C.

The following examples describe completely specific embodiments of our invention and illustrate the best mode contemplated by us of carrying out our invention; but are not to be interpreted as limiting the invention to all details of the examples.

The samples tested consisted of unstabilized controls and compositions containing stabilizer in an amount equal to 4% by weight of the weight of the chlorinated polyethylene. In all tests the chlorinated polyethylene sample was gound to about —40 mesh powder. Solutions of the stabilizers in volatile solvents, such as methanol, were used to facilitate blending of the stabilizers with the polymer. These solutions were added to the samples of powdered polymer and the mixtures were stirred under $N_2$ at ambient temperatures until completely dried.

About 2–3 g. of each prepared sample were heated in open test tubes in a block heater at 200° C. for 60 minutes, except where specified otherwise. This heat treatment resulted in the thermal breakdown of the unstabilized samples into a certain percentage of a cross-linked product, or gel; as well as resulting in a discoloration of the polymer, manifested by darkening. The quantitative value of the discoloration was measured using a reflectance meter with a green filter, by comparing the reflectance of the sample to that of a standard white magnesium oxide sample. The reflectance reading obtained on the discolored sample was then expressed as "percent whiteness," the reflectance of the standard being taken as 100% whiteness.

The amount of crosslinked product or gel formed as a result of the heat treatment was determined in accordance with the following procedure:

About 0.2 to 0.3 g. of the heat treated polymer was weighed into a tared stainless steel basket made of 250 mesh screen. This basket was placed into a Soxhlet extractor containing approximately 125 ml. monochlorobenzene, and refluxed for six hours. The non-crosslinked product was extracted, permitting gravimetric determination of the crosslinked gel. During the extraction the system was kept under slow $N_2$ stream to prevent oxidation.

Table I contains comparative data obtained on a 60.1 weight percent chlorine-containing high molecular weight chlorinated polyethylene for which the polyethylene was produced in accordance with Example 6 of the above cited British Patent 858,674, and the chlorination was carried out in accordance with Example 3 of the above cited French Patent 1,316,044. This polymer had an intrinsic viscosity of 4.2, and a glass transition temperature of about 73° C.

TABLE I

| Test | Stabilizer | Percent Whiteness | Percent Gel |
|---|---|---|---|
| Control A | Unstabilized polymer | 12 | 34 |
| Example 1 | Triallylcyanurate | 42 | 0 |
| Example 2 | Tribenzylcyanurate | 28 | 2 |
| Example 3 | 2,4,6-(p-ethylphenyl)cyanurate | 21 | 4 |
| Example 4 | Triallylisocyanurate | 20 | 0 |
| Example 5 | Tris(2-hydroxyethyl)isocyanurate | 10 | 1 |
| Comparison 1 | Triphenylisocyanurate | 10 | 48 |
| Comparison 2 | Triglycidylcyanurate | 8 | 33 |

The last two compounds included in Table I illustrate the unpredictability of the stabilizing action of the compounds that are structurally analogous to those which have proven themselves to be good stabilizers.

Table II contains comparative results on a 27 percent by weight chlorine-containing chlorinated polyethylene having a lower molecular weight than the polyethylene used to obtain the values shown in Table I as evidenced by the intrinsic viscosity of the chlorinated polymer used for the tests represented in Table II being 1.0. The glass transition temperature of the chlorinated polymer used was —26° C. The heat treatment was conducted at 150° C. for 60 minutes.

TABLE II

| Test | Stabilizer | Percent Whiteness |
|---|---|---|
| Control B | Unstabilized polymer | 17 |
| Example 6 | Triallyl cyanurate | 42 |

In Table III comparative data are presented on a chlorinated polyethylene containing about 67–69 percent chlorine, and having an intrinsic viscosity of 0.7 and essentially random chlorine substitution, with a glass transition temperature of about 150° C. The test samples were heated at 230° C. for 30 minutes.

TABLE III

| Test | Stabilizer | Percent Whiteness | Percent Gel |
|---|---|---|---|
| Control C | Unstabilized | 4 | 16 |
| Example 7 | Triallyl cyanurate | 5 | 8 |

As can be seen from the preceding tables, the stabilizers of the invention can advantageously be used on chlorinated polyethylenes containing a variety of chlorine concentrations and having a wide range of molecular weights, to obtain the desired beneficial results.

We claim:

1. A composition which comprises a chlorinated polyethylene and in effective stabilizing amount a member selected from the group consisting of triallylcyanurate; tribenzylcyanurate; 2,4,6-(p-ethylphenyl)cyanurate; triallylisocyanurate; and tris(2-hydroxyethyl)isocyanurate.

2. The composition of claim 1, wherein said chlorinated polyethylene has a chlorine content between 20 and 70 percent by weight.

3. The composition of claim 2, wherein said chlorinated polyethylene is a high molecular weight polymer with random chlorination, having an intrinsic viscosity in the range between 1.5 and 5 deciliters per gram, and a low glass transition temperature in the range not above 0° C. for a polymer of 20% chlorine content and rising up to about 150° C. for a polymer of 70% chlorine content, said member being present in a concentration between 0.5 and 10% by weight of said polymer.

4. The composition of claim 2, wherein said chlorinated polyethylene is a polymer having an intrinsic viscosity in the range between 0.2 and 1.5 deciliters per gram, said member being present in a concentration between 0.5 and 10 percent by weight of said polymer.

References Cited by the Examiner

UNITED STATES PATENTS

| | | | |
|---|---|---|---|
| 3,092,612 | 6/1963 | Makowski | 260—45.9 |
| 3,156,690 | 11/1964 | Dexter et al. | 260—45.8 |
| 3,200,119 | 8/1965 | Hopkins | 260—248 |
| 3,211,585 | 10/1965 | Meyer et al. | 260—248 |
| 3,217,004 | 11/1965 | Hechenbleikner et al. | 260—45.75 |

LEON J. BERCOVITZ, *Primary Examiner.*

H. E. TAYLOR, *Assistant Examiner.*